United States Patent [19]

Hoshall et al.

[11] 4,344,580

[45] Aug. 17, 1982

[54] FIBROUS MATERIAL APPARATUS

[76] Inventors: Thomas C. Hoshall, 4005 N. Pennsylvania, Oklahoma City, Okla. 73112; LaVern L. Hicks, 117 Parkland Dr., Yukon, Okla. 73099; Larry Renth, 4825 NW. 75th, Oklahoma City, Okla. 73132

[21] Appl. No.: 139,885

[22] Filed: Apr. 14, 1980

[51] Int. Cl.³ .............................................. B02C 18/00
[52] U.S. Cl. ...................................... 241/60; 198/664; 241/101 A; 241/260.1; 366/322; 366/324; 406/57
[58] Field of Search ................ 366/322, 324; 198/664; 406/56, 57, 102, 135; 241/101 A, 246, 247, 248, 260.1, 295, 293, 294, 60, 18, 30

[56] References Cited

U.S. PATENT DOCUMENTS

| | | | |
|---|---|---|---|
| 2,487,503 | 11/1949 | Witter | 406/57 X |
| 3,323,570 | 6/1967 | Tullock et al. | 366/322 X |
| 3,529,870 | 9/1970 | Woten | 406/135 X |
| 3,648,826 | 3/1972 | Brooks | 198/664 X |
| 3,861,599 | 1/1975 | Waggoner | 406/135 X |

FOREIGN PATENT DOCUMENTS 1262173 3/1968 Fed. Rep. of Germany ... 241/260.1

*Primary Examiner*—Mark Rosenbaum
*Attorney, Agent, or Firm*—Robert M. Hessin

[57] ABSTRACT

A device for dispensing loose, fibrous material comprising a housing having a reservoir disposed therein for containing the loose fibrous material to be dispensed. The housing has a passageway which extends from the reservoir through which the material is dispensed. At least one auger disc is rotatably mounted in the reservoir approximately adjacent the passageway. A motor or the like is provided to rotate the auger disc such that insulation material encountered by the auger disc is urged toward the passageway. Preferably a bar extends across the reservoir and is spaced from the edge of the auger disc such that as the auger disc rotatingly encounters the fibrous material the bar presents an obstacle to the material which is carried by the auger disc. A centrifugal pump is connected to the passageway by the auger disc. The suction inlet which is connected to the passageway is preferably offset from the center of the housing. A new method of blowing abrasive material is achieved by passing the material through the centrifugal pump.

6 Claims, 6 Drawing Figures

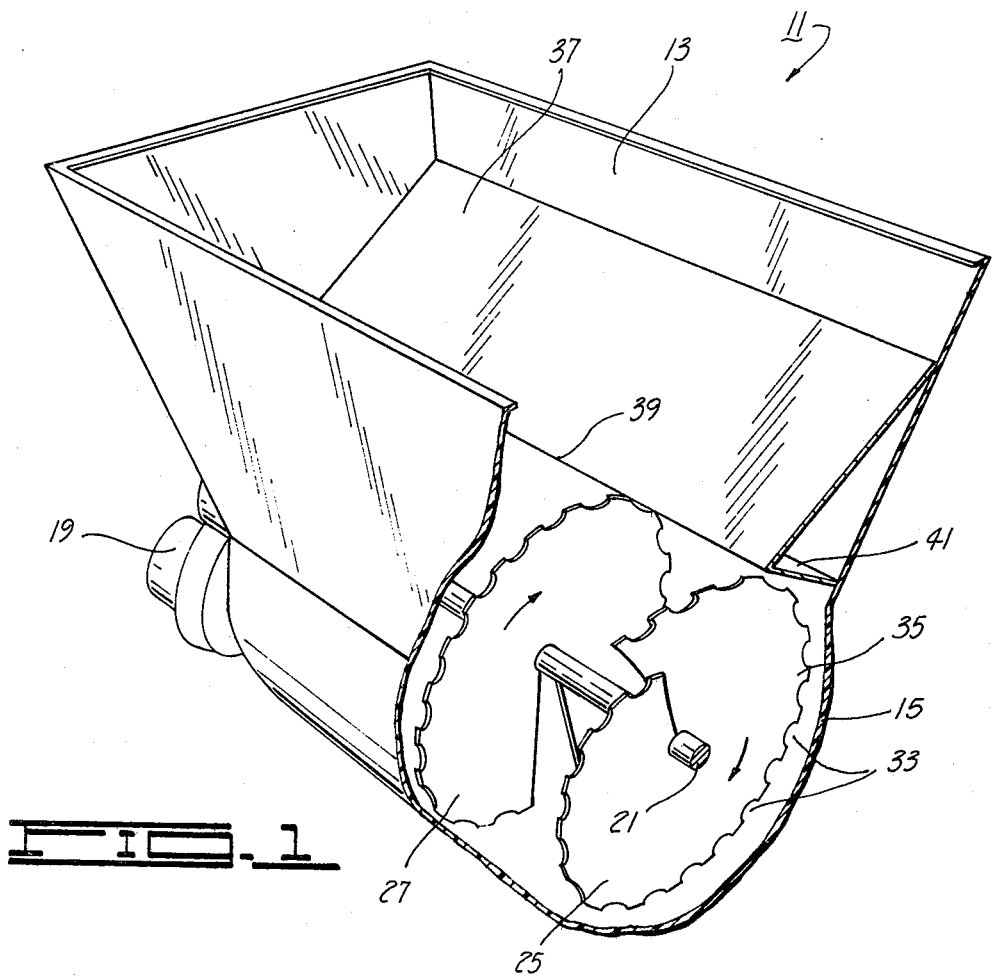
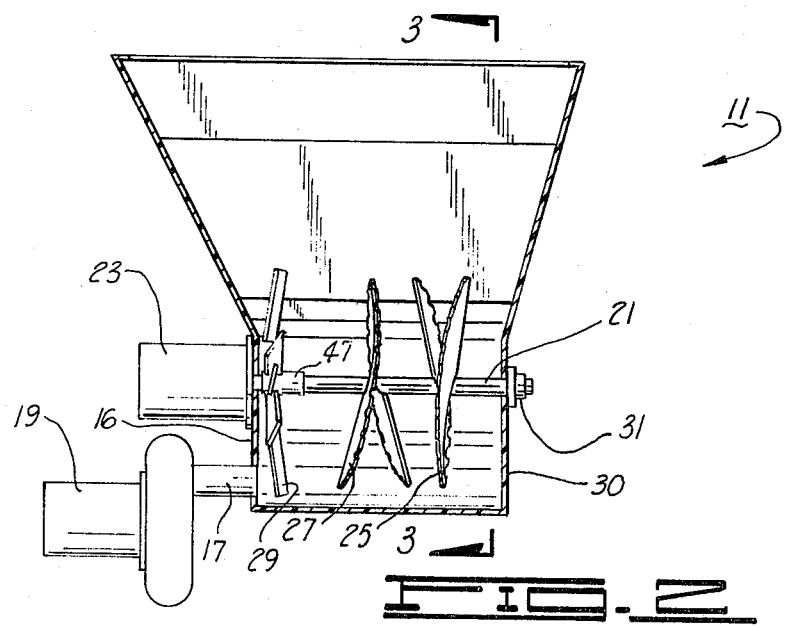

U.S. Patent  Aug. 17, 1982  Sheet 2 of 2  4,344,580
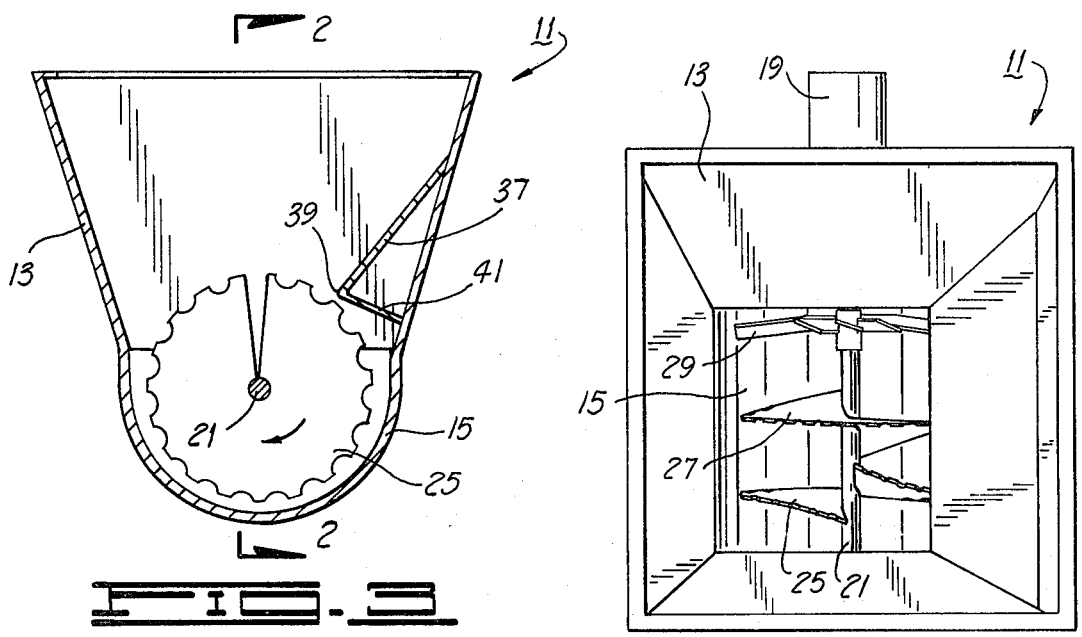
FIG. 3
FIG. 4
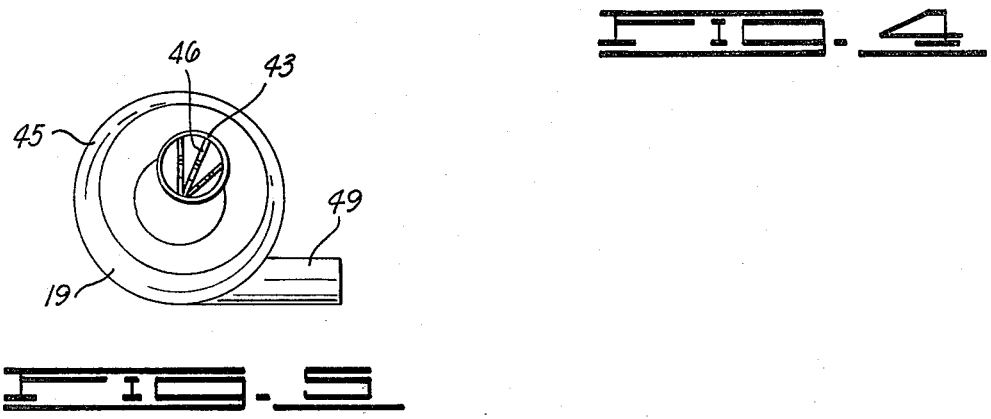
FIG. 5
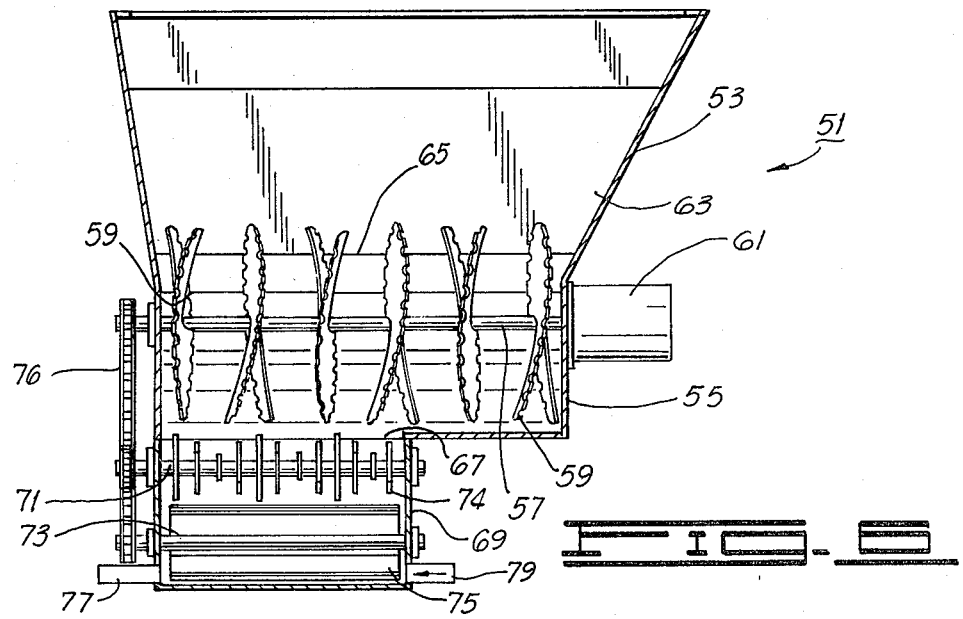
FIG. 6

FIBROUS MATERIAL APPARATUS

BACKGROUND OF THE INVENTION

1. Field of the Invention

This invention relates in general to devices for dispensing and delivering fibrous material, and more particularly, but not by way of limitation, to apparatus and methods for dispensing and blowing fibrous material to a desired location.

2. Brief Description of the Prior Art

A wide variety of insulation materials are presently in use. These insulation materials include granulated rock wool, granulated mineral fiber wools, glass fiber materials such as fiberglass, cellulose fibers, expanded mica, and other fibrous materials. Dispensing and delivering these insulation materials to desired locations is often a problem. Frequently insulation materials are used to insulate remote locations such as attics and interior wall spaces. Delivery to these remote locations is especially a problem.

In the process of dispensing and delivering insulation materials, several steps are required. First, the material is usually supplied in bags in which the material is somewhat compacted. Since loose and expanded material insulates better than compacted material, it is necessary to break up or separate the compacted, bag material into an expanded condition. Second, it is necessary to regularly dispense the material which has been broken up and separated. Finally, it is necessary to regularly deliver the dispensed material to a remote location where insulation is needed. The above steps are made more difficult by the abrasive nature of some insulation material, especially glass fiber and rock wool materials.

The equipment used in the past for processing insulation material from bags to remote locations generally requires a blower device. One such blower device is shown in U.S. Pat. No. 3,529,870 to Woten. The Woten insulating machine has a hopper into which the compacted materials from bags is poured. A paddle wheel rotates inside the hopper to breakup the insulation material into a less compacted state. An auger rotates at the bottom of the hopper to move the material which has been broken up by the paddle wheel over a feeder mechanism. A stuffer bar rotates in this feeder mechanism to stuff the material supplied by the auger into an air lock. The air lock has separate compartments which rotatingly move the stuffed material into an airstream. This airstream is created by a blower, the outlet of which is connected to the air lock. The air lock is necessary to maintain the pressure created by the blower as the insulation material is passed into the airstream. The insulation material enters the airstream and is blown through a hose to a desired remote location.

Another type of blowing device is shown in U.S. Pat. No. 3,995,775 to Birkmeier. The Birkmeier invention is restricted solely to cellulosic insulation materials. This cellulosic blowing machine has a vertically disposed cylindrical hopper. At the bottom of the hopper is a set of rotating arms. These rotating arms move the material around the bottom of the hopper and somewhat break up the material in the process of passing the material over a suction engrance. This entrance is disposed in the lower wall of the hopper and is connected to the inlet of a centrifugal pump. The outlet of the pump is connected to a hose, allowing the cellulosic material to be blown to a desired remote location. Thus, the cellulosic material is blown directly through and by means of the centrifugal pump. One reason this invention is restricted solely to cellulosic insulation material is the fact that it is being passed through the centrifugal pump. The prior art has regarded the abrasion created by glass fiber or mineral wool as prohibiting the passage of such material through a centrifugal pump.

In fact, is has long been thought that machines which are suitable for delivering glass fiber or mineral wool are not suitable for delivering cellulosic insulation. As stated in Column 1, lines 12–16 of the Birkmeier patent, "It has been found that insulation delivery machines which are used, for examples (sic), to deliver glass fiber insulation or mineral wool insulation are generally not acceptable for use in delivering cellulosic insulation." As stated before, the abrasiveness of rock wool and fiberglass creates part of this problem. In addition to the difference in abrasion, it is also well known that cellulosic insulation materials differ from the rock wool and glass fiber insulation materials in their degree of separability. Rock wool is more difficult to separate into discrete and less dense segments than is the cellulosic material.

In designing devices for dispensing and delivering insulation materials, yet another problem has been dispensing a uniform quantity of material into the blowing device. Because fibrous material is loose and yet adhesive, it tends to clog or bunch up. When this happens, the insulation ability of the material is reduced. Also, when clogging and bunching occur, the blower operates without insulation material passing therethrough. This is an inefficient operation of the blower. In extreme circumstances, the insulation material clogs or bridges completely halting the process until the machine is manually unclogged.

As shown by the Woten and Birkmeier patents, the devices for dispensing and delivering insulation material have ranged from very complicated machines such as the Woten machine, to simpler machines such as the Birkmeier machine. The complicated machines have been suitable for rock wool or fiberglass type materials, while the simpler machines have been used for cellulosic materials. None of these machines, however, have been able to dispense and deliver all types of fibrous insulation material in an efficient and simple manner.

SUMMARY OF THE INVENTION

It is accordingly an object of the present invention to provide an improved apparatus for dispensing fibrous materials. More particularly, this invention provides an improved device for dispensing and delivering insulation material. Also, this invention provides a blowing means for blowing abrasive insulation material to a desired location.

It is also an object of the present invention or provide an improved dispensing device which can be used for dispensing a wide variety of insulation materials including cellulosic material, fiberglass and rock wool.

It is also an object of the present invention to provide a device for dispensing and delivering insulation material which is more energy efficient.

Still another object of the present invention is to provide a device for dispensing and blowing fibrous material (including all types of insulation material) which has a more uniform volume flow of material.

Yet another object of the present invention is to provide a new method of blowing abrasive fibrous material such as fiberglass and rock wool.

In accordance with these objects the present invention provides a device for dispensing fibrous material. The device has a housing with a reservoir disposed therein for containing the fibrous material to be dispensed. The housing has a passageway which communicates the reservoir to an outlet. At least one auger disc is rotatably mounted and disposed in the reservoir approximately adjacent the passageway. A rotation means is provided for rotating the auger disc such that fibrous material encountered by the rotating auger disc is urged toward the passageway. A bar is preferably included which extends across the reservoir approximately parallel to the axis of rotation of the auger disc. This bar is spaced from the edge of the auger disc such that, as the auger disc rotatingly encounters fibrous material, the bar presents and obstacle to the fibrous material carried by the auger disc.

A blowing means is preferably provided which comprises a centrifugal pump having an abrasion resistant pump housing and impeller. The suction inlet of the pump housing is connected to the passageway and outlet toward which the auger disc urges the material. Preferably the inlet of the centrifugal pump is offset from the center of the pump such that the fibrous material encounters a relatively outer portion of the impeller of the centrifugal pump.

A new method of blowing abrasive fibrous material is achieved in introducing the abrasive material into the suction inlet of a centrifugal pump having an abrasion resistant housing and impeller and then passing the material through the centrifugal pump to blow the material. The material is then conducted to a desired location by a hose or the like connected to the outlet of the centrifugal pump.

For a further understanding of the invention and further objects, features and advantages thereof, reference may now be had to the following description taken in conjunction with the accompanying drawings.

BRIEF DESCRIPTION OF THE DRAWINGS

FIG. 1 is a perspective view of an embodiment of the present invention with one end cut away to show inside detail.

FIG. 2 is a side cross-sectional view of the device shown in FIG. 1 taken along the line shown in FIG. 3.

FIG. 3 is an end cross-sectional view of the device shown in FIG. 1 taken along the line shown in FIG. 2.

FIG. 4 is a top plan view of the device shown in FIG. 1.

FIG. 5 is a side view of a pump shown in FIG. 1, shown detached.

FIG. 6 is a side cross-sectional view of an alternate embodiment of the present invention taken along a line corresponding to the line shown in FIG. 2 for the embodiment of FIG. 1.

DETAILED DESCRIPTION OF THE PREFERRED EMBODIMENTS

The device of the present invention is particularly adapted for use in the process of blowing insulation material such as cellulosic fibers, fiberglass, rock wool, expanded mica, etc. More particularly, this device presents a novel device for dispensing and regulating the movement of these insulation materials. Of course, other materials which have properties which are similar to materials can also be dispensed and/or blown by this device.

Referring now to FIGS., and particularly to FIGS. 1-4, the device of the present invention has a hopper 11 for receiving and containing the insulation material to be dispensed and blown to a desired location. The upper portion of housing 11 is an open loading bin 13. The bin 13 is shaped like a frustum of a downwardly pointing, irregular rectangular pyramid surface. The top of the bin 13 is open to receive insulation material therethrough. The lower end of bin 13 is connected to the upper end of dispensing trough 15 which comprises the lower portion of hopper 11. The trough 15 has a closed-ended cylindrical tubular-segment shape. This shape is provided to allow rotation of elements within the trough 15 in close relation to the walls of the trough 15. Trough 15 combines with bin 13 to form a reservoir for holding and containing the fibrous material in the dispensing process.

Extending outwardly from the lower part of the end wall 16 of trough 15 is a tube 17. Tube 17 connects trough 15 and the interior of hopper 11 with the inlet of a centrifugal pump 19. Insulation material placed in hopper 11 passes into tube 17 and then into centrifugal pump 19 which blows the material to a desired location through a hose (not shown).

Rotatably mounted in trough 15 of hopper 11 is a shaft 21. One end of shaft 21 extends through end wall 16 and is connected to the drive shaft of a motor 23. Motor 23 is connected to the outside of hopper 11 and rotates shaft 21. Attached to shaft 21 is a first auger disc 25, a second auger disc 27 and a paddle disc 29. These elements 25, 27 and 29 are securely attached to shaft 21 such that they rotate with the rotation of shaft 21. The attachment can be by conventional means such as welding or by set screw. A bearing 31 is attached to end wall 30 opposite wall 16 and rotatably receives the other end of shaft 21. The auger discs 25 and 27 and the paddle disc 29 are sized such that they are slightly smaller than the inside diameter of trough 15 (which is approximately 20 inches in diameter). In this manner the edges of auger discs 25 and 27 and the edges of paddle disc 29 rotate adjacent and in close proximity to the interior walls of lower portion 15. Auger discs 25 and 27 are located in trough 15 in relation to tube 17 to allow auger discs 25 and 27 to dispense the fibrous material from bin 13 of hopper 11 through trough 15 and into tube 17. Paddle disc 29 is located between cutter disc 27 and tube 17. The individual paddles on paddle disc 29 pass in front of the opening to tube 17 as the disc 29 rotates.

The auger discs 25 and 27 are comprised of a sliced and spread disc which has circular segment cuts 33 regularly spaced in the edge thereof. By sliced and spread, it is meant that the discs 25 and 27 are not flat discs but rather have a shape formed by making a cut along a radius of a disc and then axially spreading the two edges made by the radial cut. This axial spreading causes the disc to take on an auger shape. Thus, the auger discs 25 and 27 serve to move material in an auger-like manner when they are rotated.

The regularly spaced circular segment cuts or notches 13 in the edge of discs 25 and 27 form a plurality of teeth 35 with somewhat rounded edges (rounded because of the rounded shape of the discs absent the circular segment cuts) in the edges of the discs 25 and 27. These teeth 35 encounter and carry the fibrous material as the discs rotate.

Preferably the discs 25 and 27 are spaced from each other such that a complete axial coverage is provided along the trough 15. In other words, if an object is placed at some location in the imaginary cylindrical surface plane formed by the outer edges of the combined auger discs 25 and 27 this object will be encountered by the edge of at least one of the discs as the discs are rotated. Another way of stating this same concept is that all of the inner surface of the trough has at least one of the auger disc edges pass nearby as the discs rotate. This insures that material at one end of trough 15 will be continuously moved by auger discs 25 and 27 toward the opening of tube 17 (the auger discs are oriented and rotated to achieve this effect).

The individual arms or paddles of paddle disc 29 pass in front of the entrance of tube 17. The individual arms or paddles extend regularly from shaft 21 somewhat like spokes. Rotation of these arms interrupts the steady flow of material into tube 17 to create discrete, but closely spaced, segments of flow. It also moves any clogged material away from the opening of tube 17.

Attached to an interior side wall of bin 13 is a plate 37. Plate 37 is comprised of a sheet of metal bent in an acute angle. The bend of plate 27 extends into the interior of bin 13 to form a bar or obstacle edge 39. The unbent edges of plate 37 each abut one of the walls of bin 13. Each of the ends or bent edges of plate 37 abut a respective end wall of bin 13. The unbent edges abut and are connected to a side wall of bin 13. Connection is by conventional means such as bolts (not shown).

As can be seen in FIGS. 1 and 3, plate 37, as connected in hopper 11, has a lower plate 41 and an upper plate 42 which meet at the bent edge (bar 39) of plate 37. The upper plate 41 forms a ramp which extends from the upper side of bin 13 downwardly to bar 39. This ramp serves to direct the material above bar 39 (and urged downwardly by gravity) into the upper, center edge of auger discs 25 and 27.

Bar 39 is spaced from the cutter discs 25 and 27 such that, as the auger discs 25 and 27 rotate, the edge 39 presents an obstacle to the insulation material which is carried by the discs 25 and 27. It also prevents the insulation material from "wedging" or compacting itself between the disc edge and the interior wall of trough 16 by forming a "roof" over this space.

The lower plate 41 of plate 37 supports the obstacle edge or bar 39 in its position spaced from discs 25 and 27. As can be seen in FIG. 1, the bar 39 is approximately parallel to shaft 21 and the rotational axis of auger discs 25 and 27. Thus, discs 25 and 27 are uniformly spaced from bar 39 as the discs rotate.

Because plate 37 receives an increased amount of friction and wear, it is preferable to form plate 37 and its bar 39 of hard steel.

It is also preferably to form auger discs 25 and 27 of steel. Likewise, the paddle disc 29 is preferably constructed of steel.

It is preferable to form hopper 11 from a plastic material. This material is easily formed and friction on the hopper is not as great as on the auger discs and plate 37. If desired, the hopper 11 can be molded by an injection molding process.

Of course, the hopper 11 must be mounted to a ground engaging rectangular frame or the like. For simplicity and clarity, this frame is not shown in the FIGS. Such a frame could extend about and support the upper edges of hopper 11 such that trough 15, pump 19, etc., extend freely beneath the upper edge of the frame.

Referring now to FIG. 5 it can be seen that the entrance or inlet 43 of pump 19 is offset from the center of housing 45. This offset allows a greater amount of material to be moved through the pump without clogging the pump. Therefore, even though the suction pressure in an offset inlet is less, the amount of loose fibrous material which can be passed through the pump is greater. While the reason for this is not completely understood, it is thought that the offset causes the material to encounter only the rapidly passing relatively outer portions of the impeller blades 46. This spreads and cuts the fibrous material and prevents clogging. Accordingly, this offset inlet uniquely combines with the flow or dispensing of insulation material provided by the auger discs 25 and 27.

In order to allow all types of insulation material (including abrasive fiberglass and rock wool) to be passed through pump 19, the housing and impeller of pump 19 can be made of hardened material, such as steel. To reduce abrasion the impeller and housing interior can be coated with a material such as Teflon (trademark). Some plastic coatings are also known in the art to be resistant to abrasion and/or able to reduce friction. This coating material can be used in addition to or as a substitute for making the pump out of hardened materials. The necessity of this use is determined by the extent of abrasion received by a particular pump element and its desired life.

In the past, devices used to dispense and blow abrasive insulation materials such as fiberglass and rock wool have not passed the material through the pump because the pump housings and impellers of the past were normally made of aluminum. This aluminum would be quickly worn out by the abrasion. Also, the insulation material, whether abrasive or not, would clog the pump. By using an offset inlet and by forming the impeller and housing of a low-abrasion or abrasion resistant material, these problems are overcome.

In operation, the fibrous material such as fiberglass is loaded into hopper 11 through its upper opening. For example, bags of fiberglass are opened and the compacted fiberglass is dumped into hopper 11. Gravity urges the material into contact with the upper edge of rotating auger discs 25 and 27. Discs 25 and 27 are rotated in the range of about 10 to about 120 rpm. Preferably, the discs are rotated at approximately 60 rpm. Discs 25 and 27 cut and carry portions of the material into contact with bar 39 of plate 37. In this manner, the material is shredded or separated into smaller portions (or, considered another way, the density of material is reduced). These portions are moved by the auger shape of the auger discs 25 and 27 toward the opening of tube 17.

As the material moves close to the opening of tube 17 a suction is exerted on the material urging the material toward tube 17. This suction is created by pump 19. The individual paddles of paddle disc 29 break up the material into segments as they enter the tube 17 and prevent the entrance of tube 17 from becoming clogged.

From tube 17 the material passes into the offset inlet of centrifugal pump 19. The material is then blown through the outlet 49 of pump 19. Normally, a hose (not shown) is attached to the outlet 49 and pump 19. This hose is provided to direct the blown material to a desired location such as an attic.

The operation of the auger discs 25 and 27 is more efficient than the paddle wheels used in the past. Specifically the smooth sides of the auger discs have a lower frictional contact with the insulation as it is shredded and then moved toward tube 17. As can be seen, the auger discs 25 and 27 and bar 39 cooperate to efficiently lower the density of the material dumped into hopper 11 and then move that material to tube 17. Only one shaft is required to be rotated. No material can clog the auger discs since they are relatively smooth. Furthermore, the auger discs and bar operate simply and efficiently on rock wool and fiberglass as well as on cellulosic material. Thus, all types of fibrous material can be efficiently dispensed.

Discs 25 and 27 operate more efficiently than augers (such as shown in the Woten patent). Augers move the material but do not separate and cut the material as well as the discs 25 and 27. Also, bar 39 cooperates with discs 25 and 27 to more efficiently reduce the density of the fibrous material. Such a bar is not shown in the Woten or Birkmeier patents.

Still further, passing the material directly through pump 19 allows a more efficient blowing of the material. By using the wear-resistant housing and offset inlet for pump 19 in combination with the auger discs and obstacle bar, this apparatus can take advantage of this more efficient means of blowing the material. This avoids the use of vane feeders (described above in the Woten patent) which are rapidly worn out.

This provides a new method for blowing abrasive fibrous material such as fiberglass and rock wool. This method comprises introducing the abrasive fibrous material into the inlet of a centrifugal pump having an abrasion-resistant housing and impeller. Preferably, the pump has an offset inlet to allow more material to be passed through the pump. The material passes through the pump and is blown to a desired location. This method has not been used in the past because of the abrasion produced by rock wool and fiberglass. Also, it was thought that introducing this material into the pump would tend to clog the pump. This is avoided by the offset inlet.

Referring now to FIG. 6 an alternate embodiment of the device of the present invention is shown. In this embodiment the hopper 51 has attached to it a vane feeder as described above. Hopper 51 has bin 53 and a trough 55 of the same general shape as described for hopper 11. A shaft 57 extends through bin 55 and is mounted thereon for rotation. A plurality of auger discs 59 are securely attached to shaft 57 to rotate adjacent and in close proximity to the walls of the lower portion 55. A motor 61 is attached to one end of shaft 57 outside of hopper 51. A plate 63 similar to plate 37 is mounted to one side of hopper 51 and its obstacle edge or bar 65 extends parallel to shaft 57 and is spaced from the outer edges of discs 59.

Extending along the lowest portion of trough 55 is a slot 67. Slot 67 forms an exit port for the material which is inserted into hopper 51 and dispensed by auger discs 59. Slot 67 is disposed along the bottom of one end of bin 55 so that the rotation of auger discs 59 move the material toward the slot 67. Slot 67 communicates hopper 51 with a compartment 69.

Compartment 69 is a rectangular compartment extending below hopper 51 and containing a pair of rotatably mounted shafts 71 and 73. The upper shaft 71 has attached to it a plurality of diamond-shaped members 74. The points of members 74 are directed such that adjacent members along the shafts are not pointed in the same direction. This variance in direction of the points of the diamond, produces an irregular presentation of the diamond points as the shaft rotates. As the shaft 71 rotates, the diamond-shaped members 74 stuff downwardly the material passing over slot 67.

The lower shaft 73 has attached to it outwardly extending vanes 75. The vanes 75 form axially aligned troughs which receive the material stuffed downwardly by the members 74. Rubber tips on the edges of vanes 75 engage the walls of compartment 69 such that the troughs are sealed when they point downwardly. A compartment and feeder similar to compartment 69 and its contents is shown in the Woten patent.

Shafts 71 and 73 are rotatably mounted to compartment 69 and the ends of shafts 71 and 73 extend from compartment 69. Also, one end of shaft 57 extends from hopper 51. A sprocket is attached to each of the ends of shafts 57, 71 and 73. The teeth of each of these sprockets engage a common chain 76 such that each of the shafts 57, 71 and 73 are driven in rotation by motor 61.

At the lower edge of one end of compartment 69 is a conduit 77. Opposite conduit 77 is a conduit 79 on the other end of compartment 69. Conduits 77 and 79 join with the sealed trough formed by vanes 75 to form a blowing conduit through which the material passes in the blowing process. The outlet of a pump (not shown) is connected to conduit 79 to provide a blowing airstream.

In operation, the embodiment shown in FIG. 6 operates similarly to the embodiment described above. The insulation material is loaded into hopper 51 and auger discs 59 cooperate with bar 65 to dispense the material into slot 67. At slot 67, however, the material is physically moved into vanes 75 which in turn move the material into the blowing airstream. It can thus be seen that the auger discs and obstacle bar can be used to improve the efficiency of a vane feeder machine.

While the discs, such as 25 and 27, have been described as sliced and spread auger discs having teeth regularly spaced on their edges, it is clear that other embodiments are possible. It is thought that these embodiments, while less efficient or desirable, are within the scope of the teachings of this invention. For example, the auger discs could still function without the teeth on their edges. Also, a completely flat disc mounted at an oblique angle to its rotation shaft could still operate to separate and dispense material even though it could not move the material toward one end of a trough (a slot might extend along the entire bottom wall of the trough). Other variations will be apparent to those skilled in the art.

Thus, the dispensing device of the present invention is well adapted to attain the objects and advantages mentioned as well as those inherent therein. While presently preferred embodiments of the invention have been described for the purpose of this disclosure, numerous changes in the construction and arrangement of parts can be made by those skilled in the art which changes are encompassed within the spirit of this invention as defined by the appended claims.

The foregoing disclosure and the showings made in the drawings are merely illustrative of the principles of this invention and are not to be interpreted in a limiting sense.

What is claimed is:

1. A device for dispensing fibrous material comprising:

centrifugal blower means having a radially offset inlet port and an outlet port;

a housing having a reservoir disposed therein for containing the fibrous material to be dispensed and a lower passageway which communicates said reservoir to said blower means inlet port;

at least one auger disc consisting of a sliced and spread disc having a toothed edge rotatably mounted and disposed in said reservoir approximately adjacent said passageway;

a bar extending across said reservoir parallel to the axis of rotation of said at least one auger disc and spaced adjacent said auger disc such that, as gravity urges fibrous material toward said auger disc and said auger disc rotatingly encounters said fibrous material, said bar presents an obstacle to fibrous material which is carried by said auger disc;

a ramp member extending from said bar upward to a side of said reservoir such that fibrous material above said bar is urged by gravity downwardly toward said auger disc; and means for rotating said auger disc such that insulation material encountered by said rotating auger disc is urged toward said passageway.

2. The apparatus of claim 1 which further comprises:

a plurality of paddles radially extending from a shaft rotatably mounted in said housing between said auger disc and said passageway; and means for rotating said paddles such that each paddle passes across said passageway in the process of rotation.

3. The device of claim 1 wherein said inlet is offset from the center of the pump housing.

4. The device of claim 3 wherein said centrifugal pump has a housing and impeller comprised of abrasion-resistant material.

5. The device of claim 4 wherein said housing is made of steel and said impeller is coated with a low abrasion material.

6. The device of claim 5 wherein said reservoir housing has a trough disposed at the lower end thereof, the trough having rounded side and bottom walls, said auger means being disposed in said trough such that the edge of said auger means rotates in close relation to said rounded side walls.

* * * * *